Nov. 14, 1939.  W. SYKES  2,179,803
APPARATUS FOR PRODUCING BEAMS, COLUMNS, OR THE LIKE
Filed July 2, 1936  15 Sheets-Sheet 3
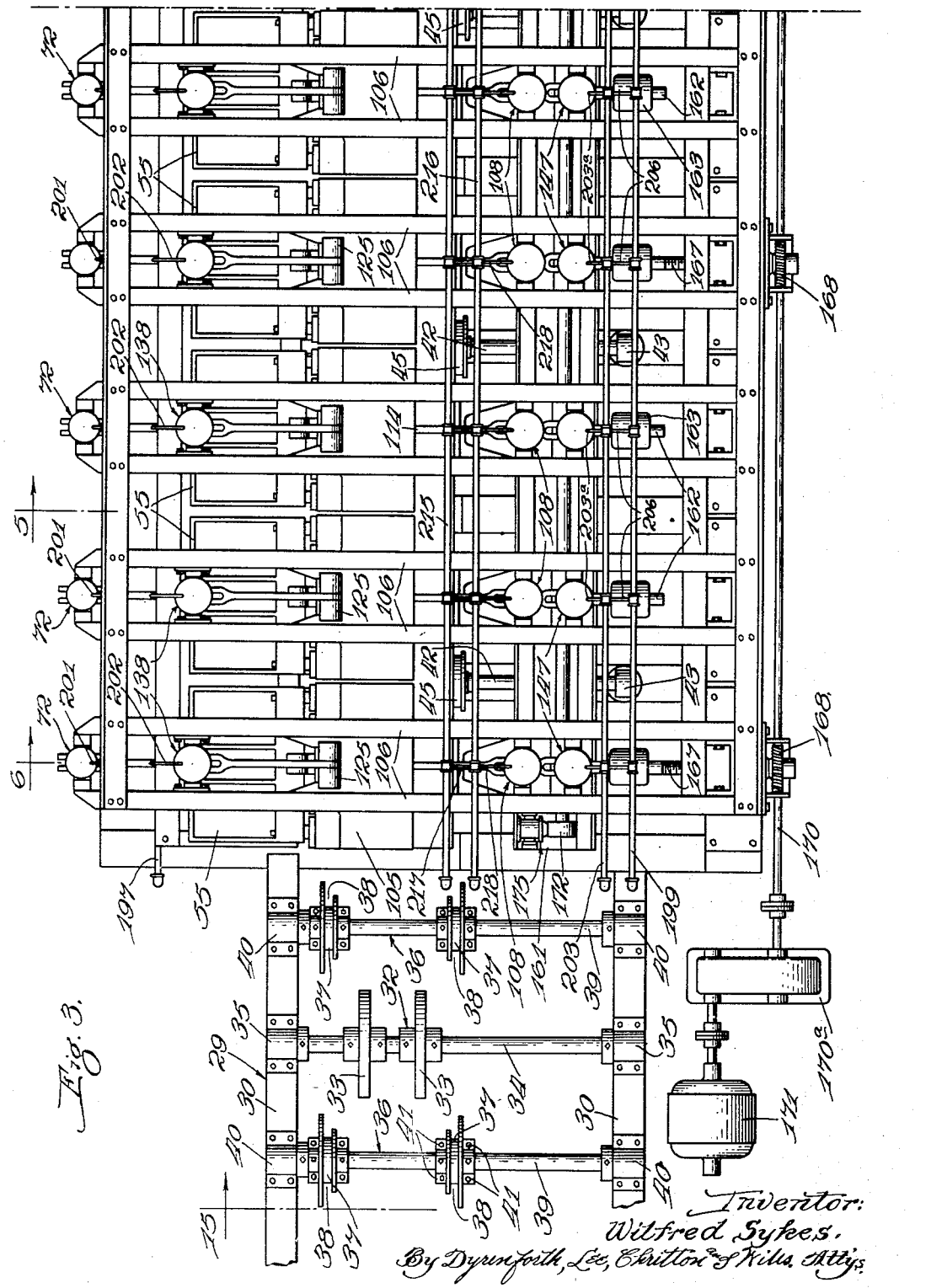

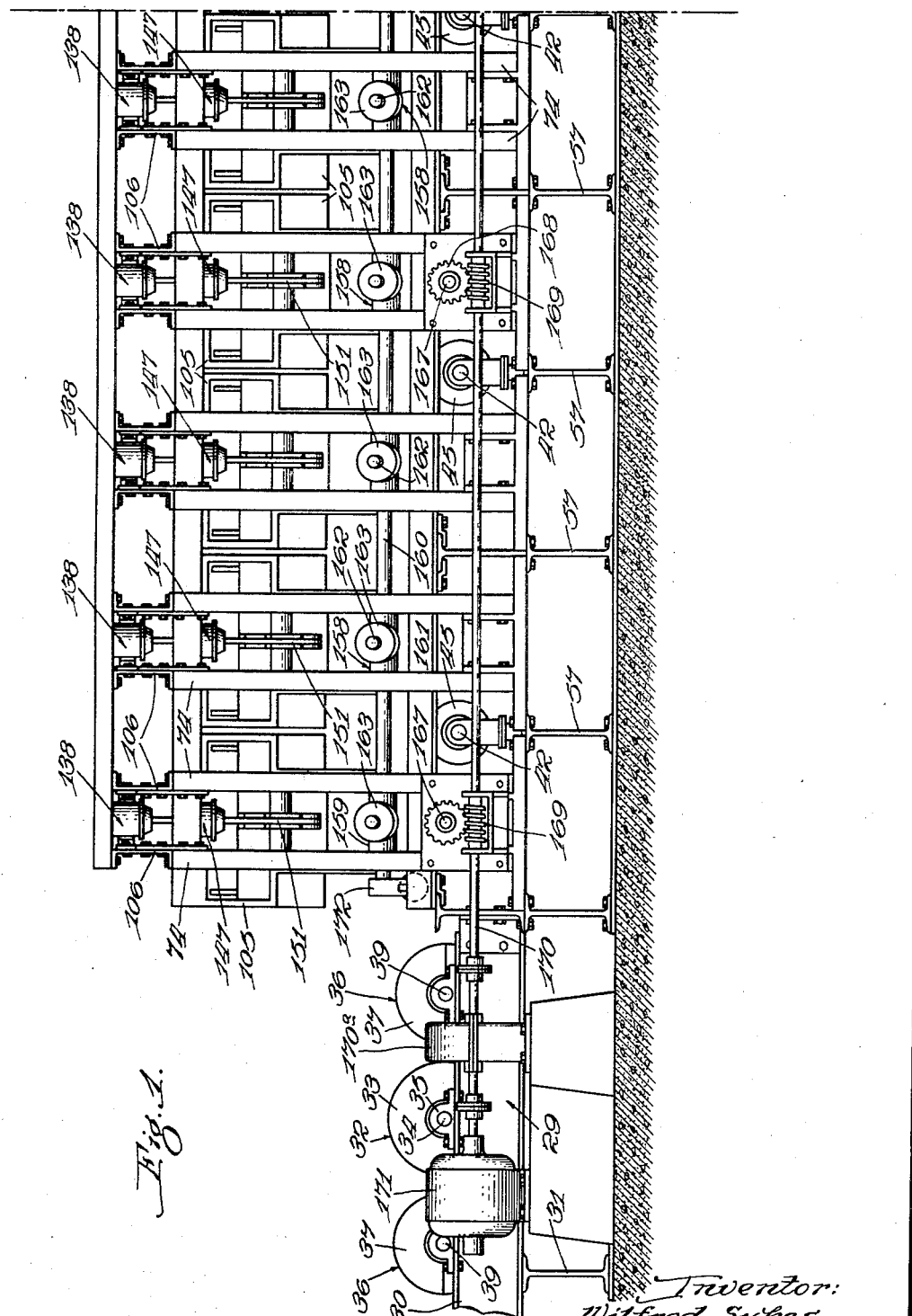

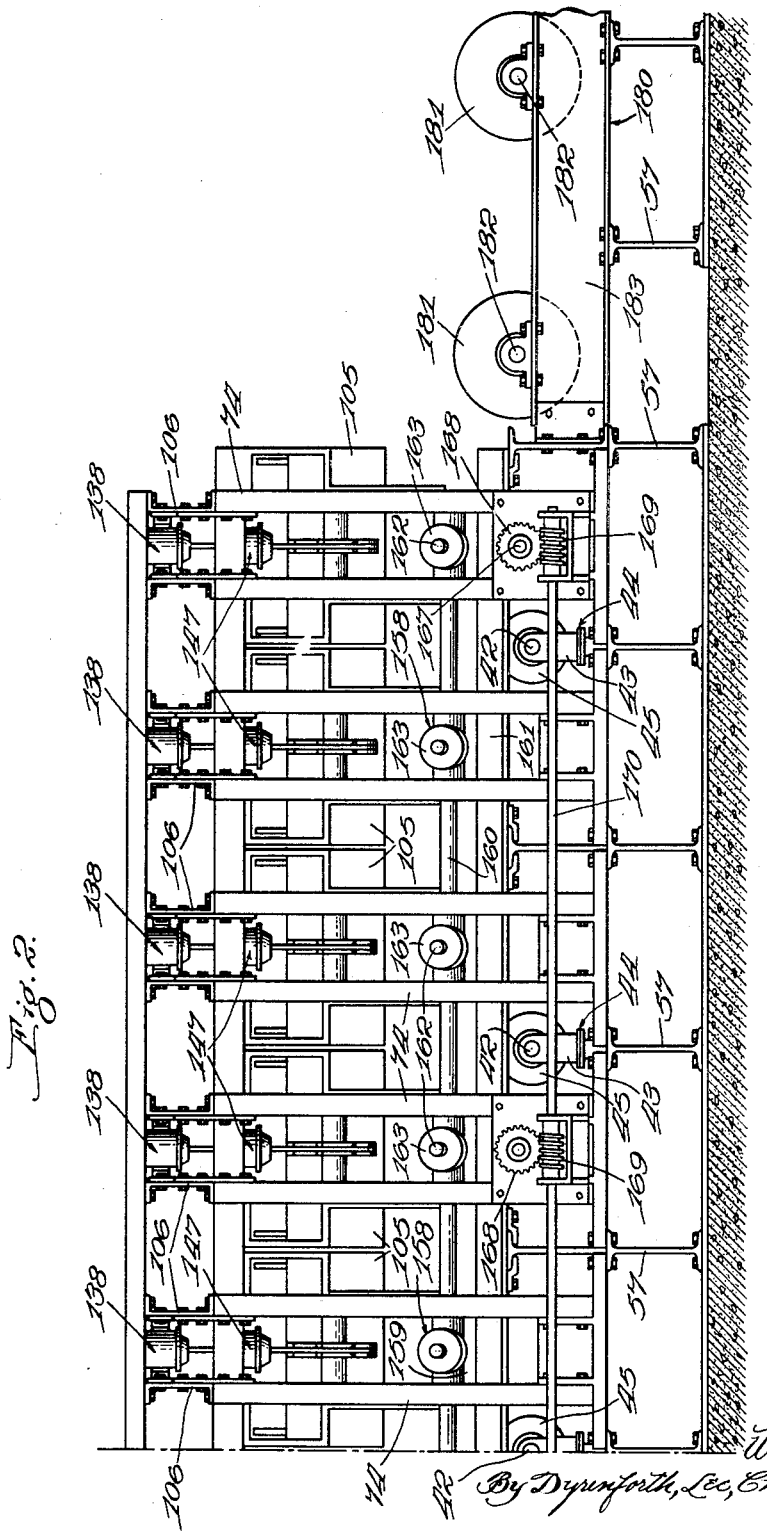

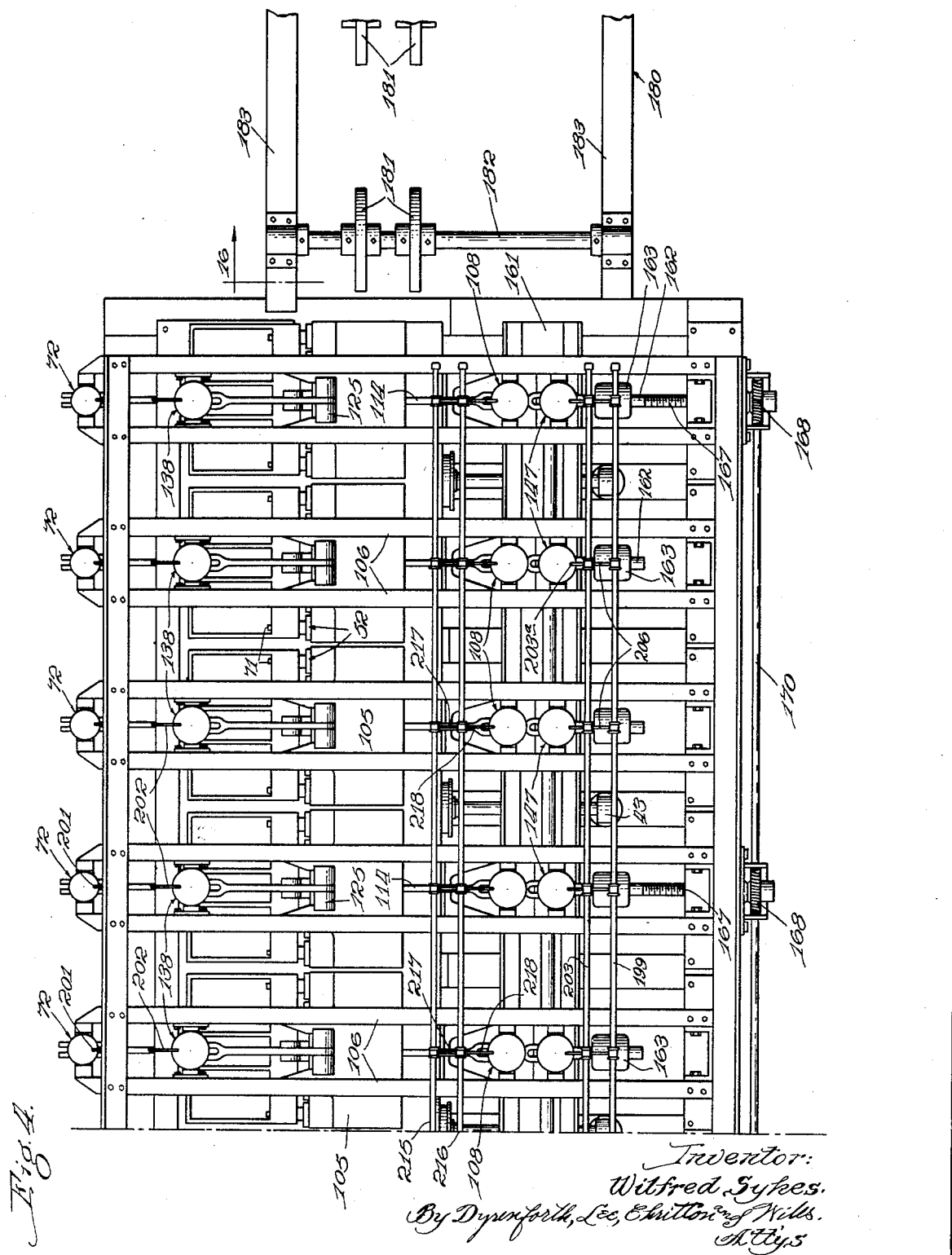

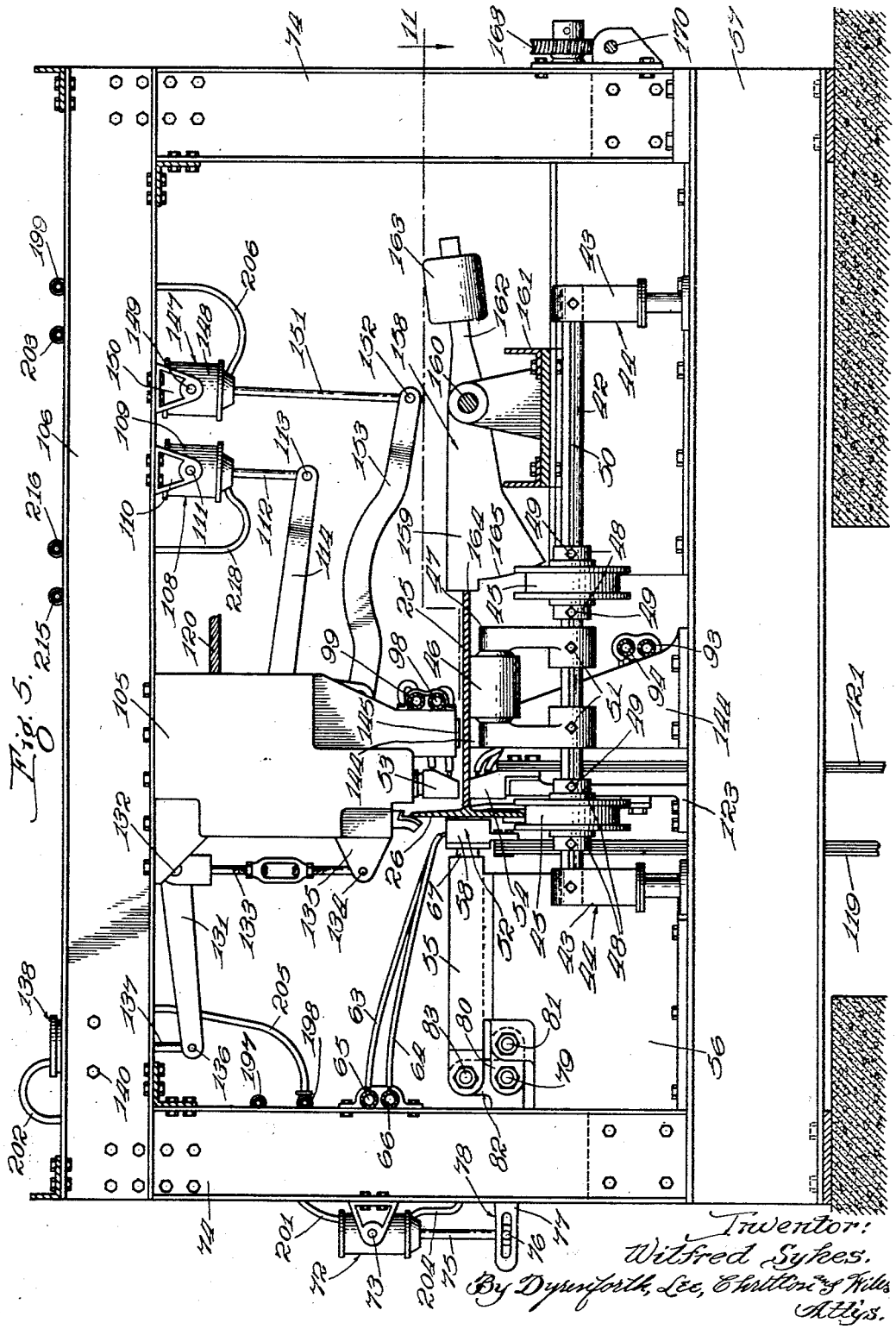

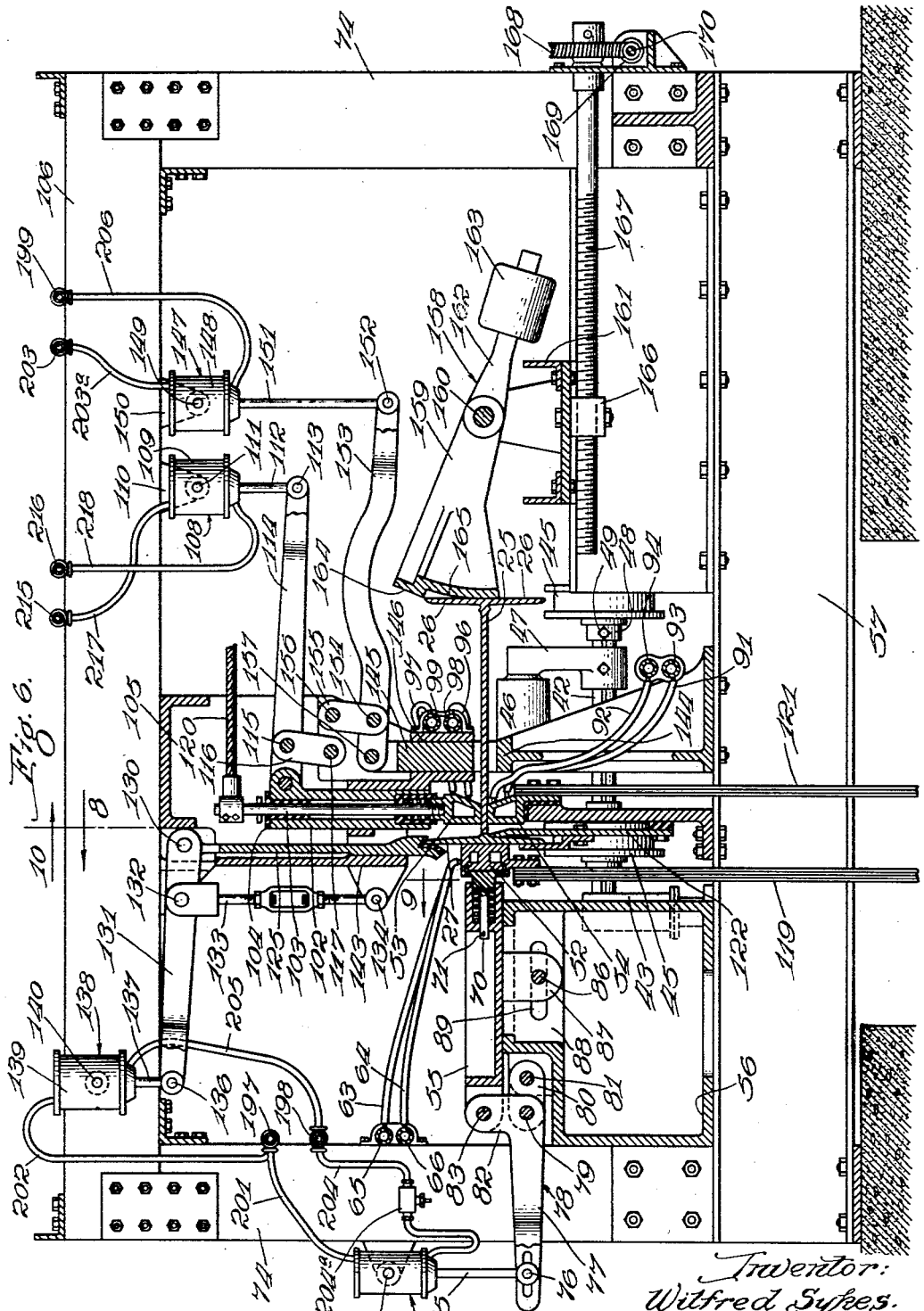

Nov. 14, 1939. W. SYKES 2,179,803
APPARATUS FOR PRODUCING BEAMS, COLUMNS, OR THE LIKE
Filed July 2, 1936 15 Sheets-Sheet 7
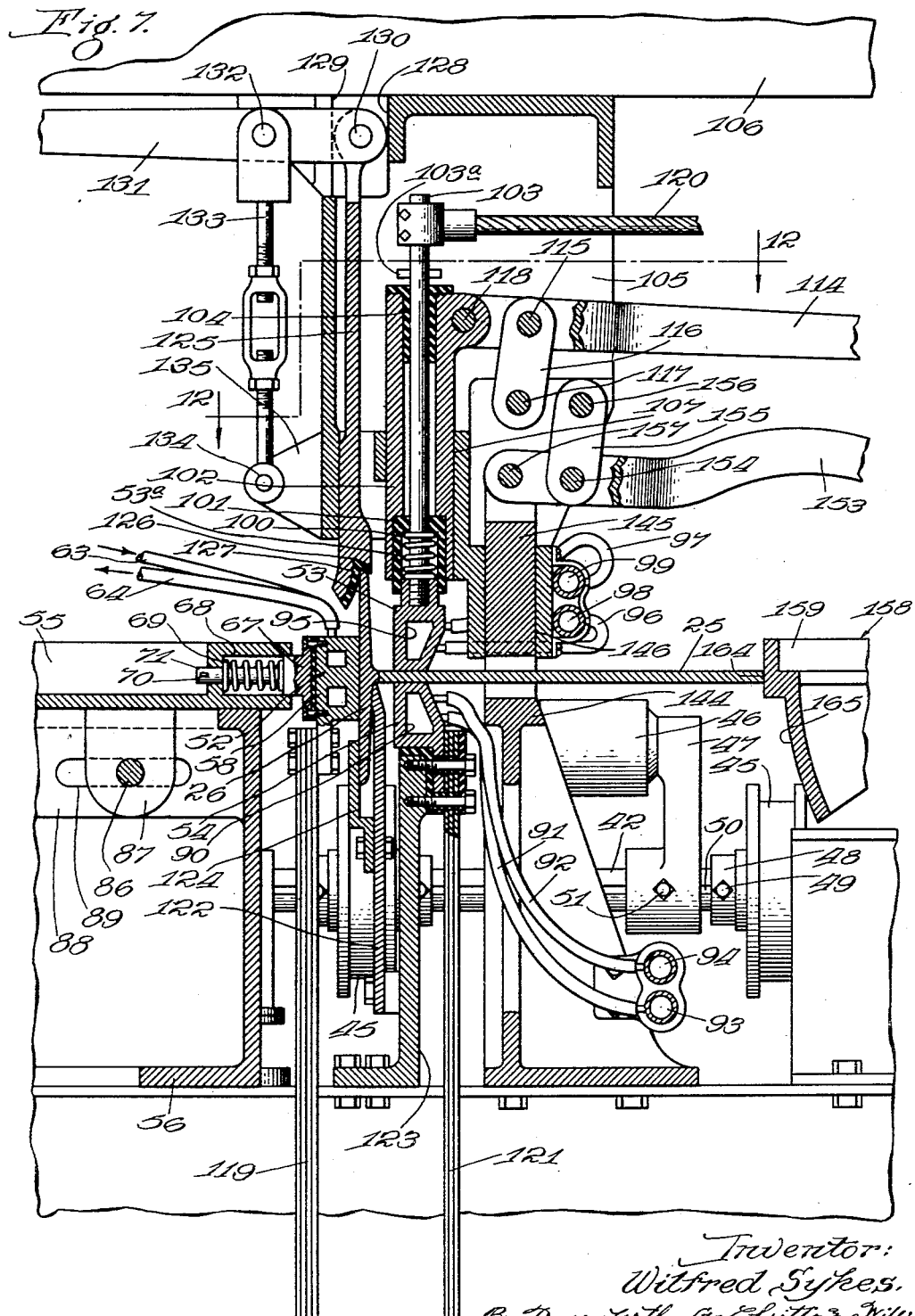

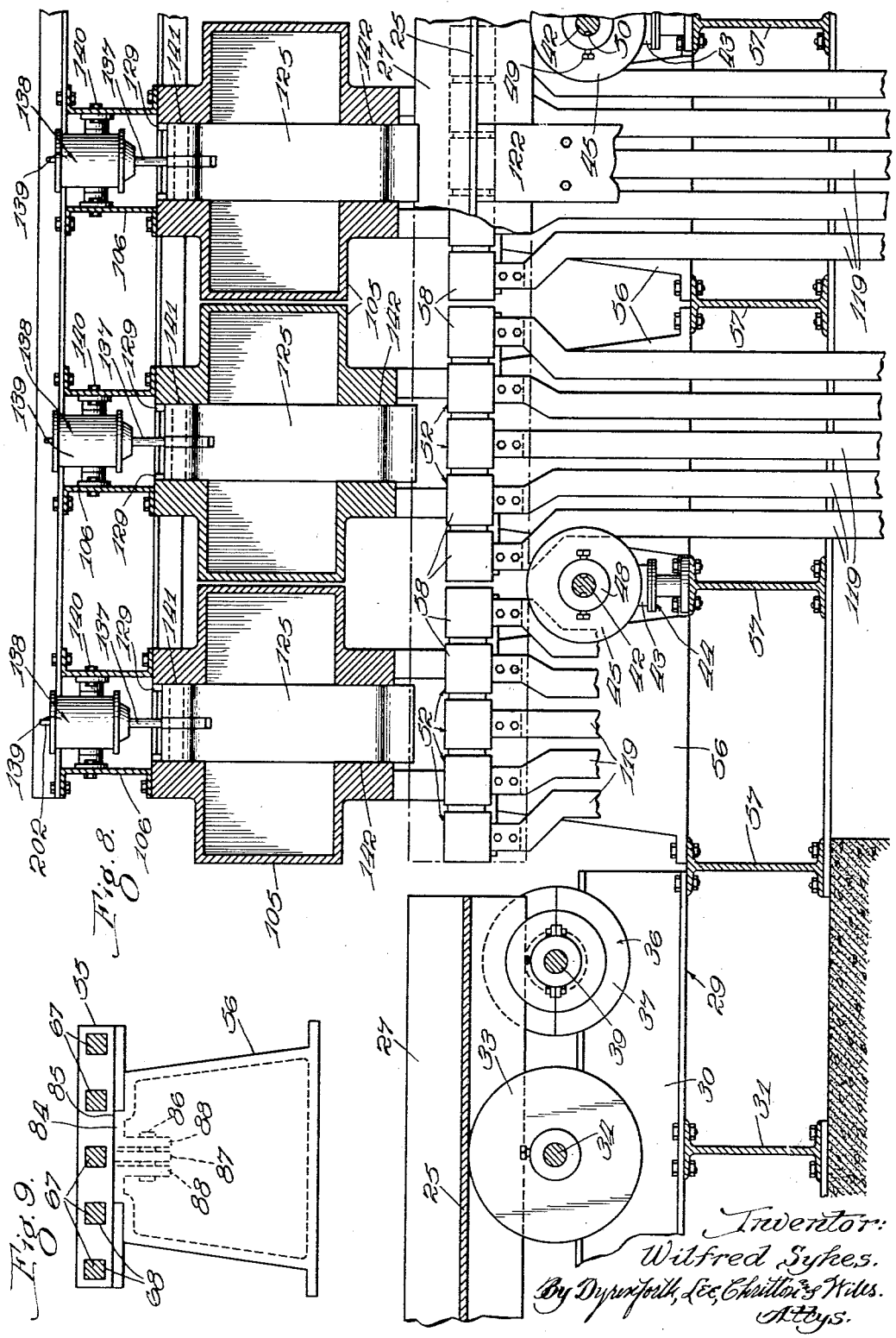

Nov. 14, 1939.  W. SYKES  2,179,803
APPARATUS FOR PRODUCING BEAMS, COLUMNS, OR THE LIKE
Filed July 2, 1936  15 Sheets-Sheet 9

Inventor:
Wilfred Sykes.
By Dyrenforth, Lee, Chritton & Wiles.
Attys.

Nov. 14, 1939.　　　　　W. SYKES　　　　　2,179,803
APPARATUS FOR PRODUCING BEAMS, COLUMNS, OR THE LIKE
Filed July 2, 1936　　　15 Sheets-Sheet 11

Inventor:
Wilfred Sykes.
By Dyrenforth, Lee, Chritton and Wiles
Attys.

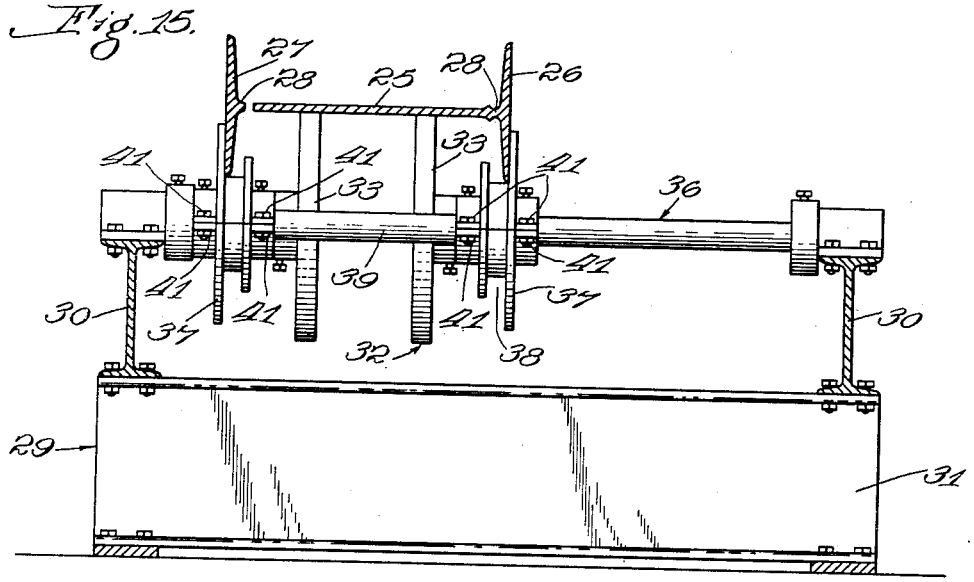
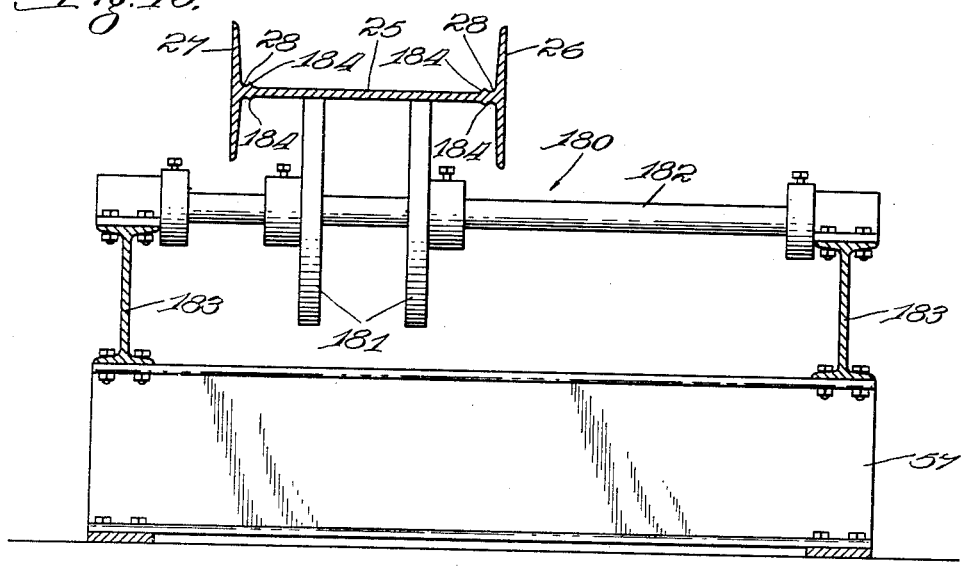
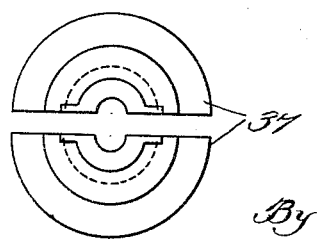

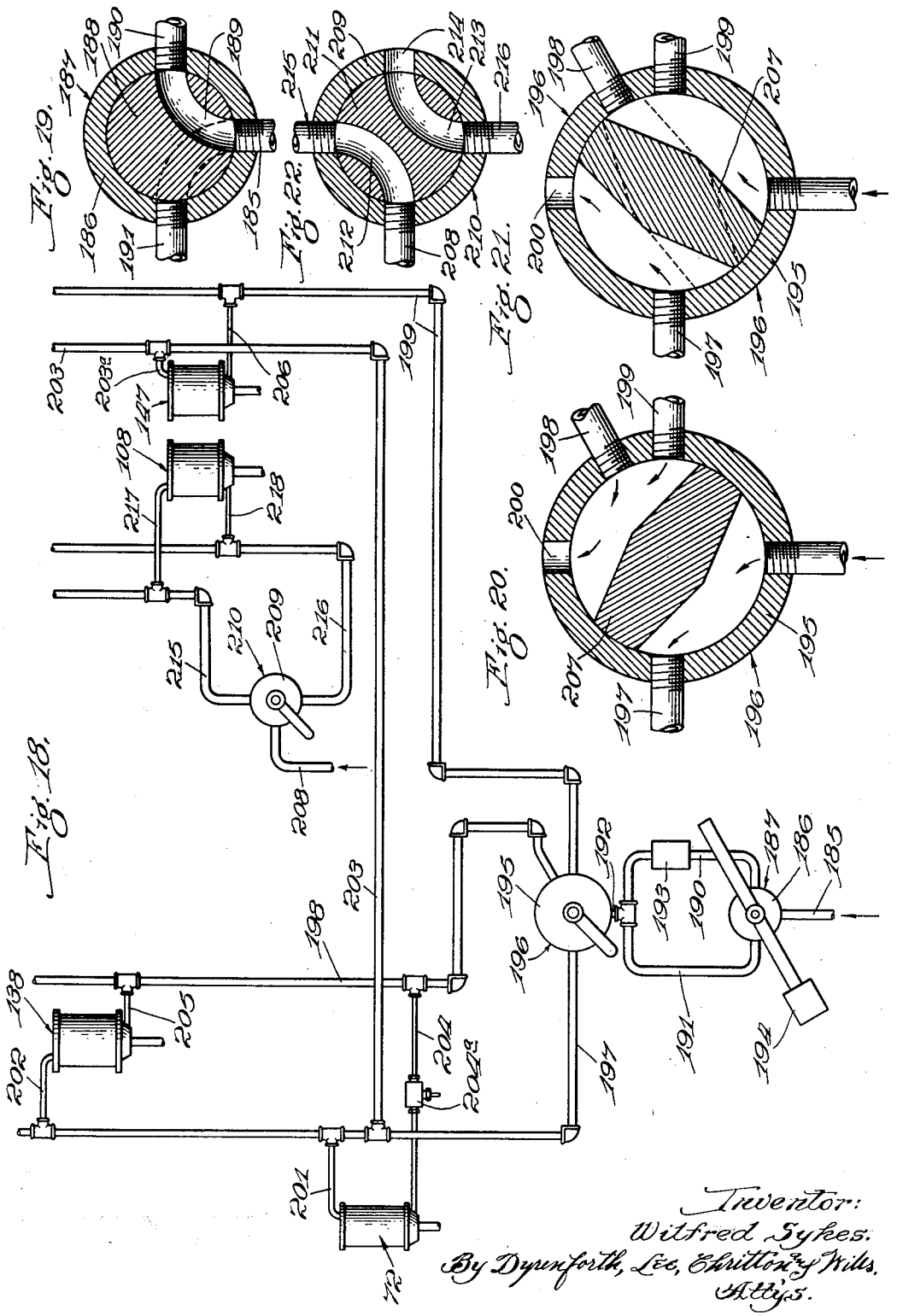

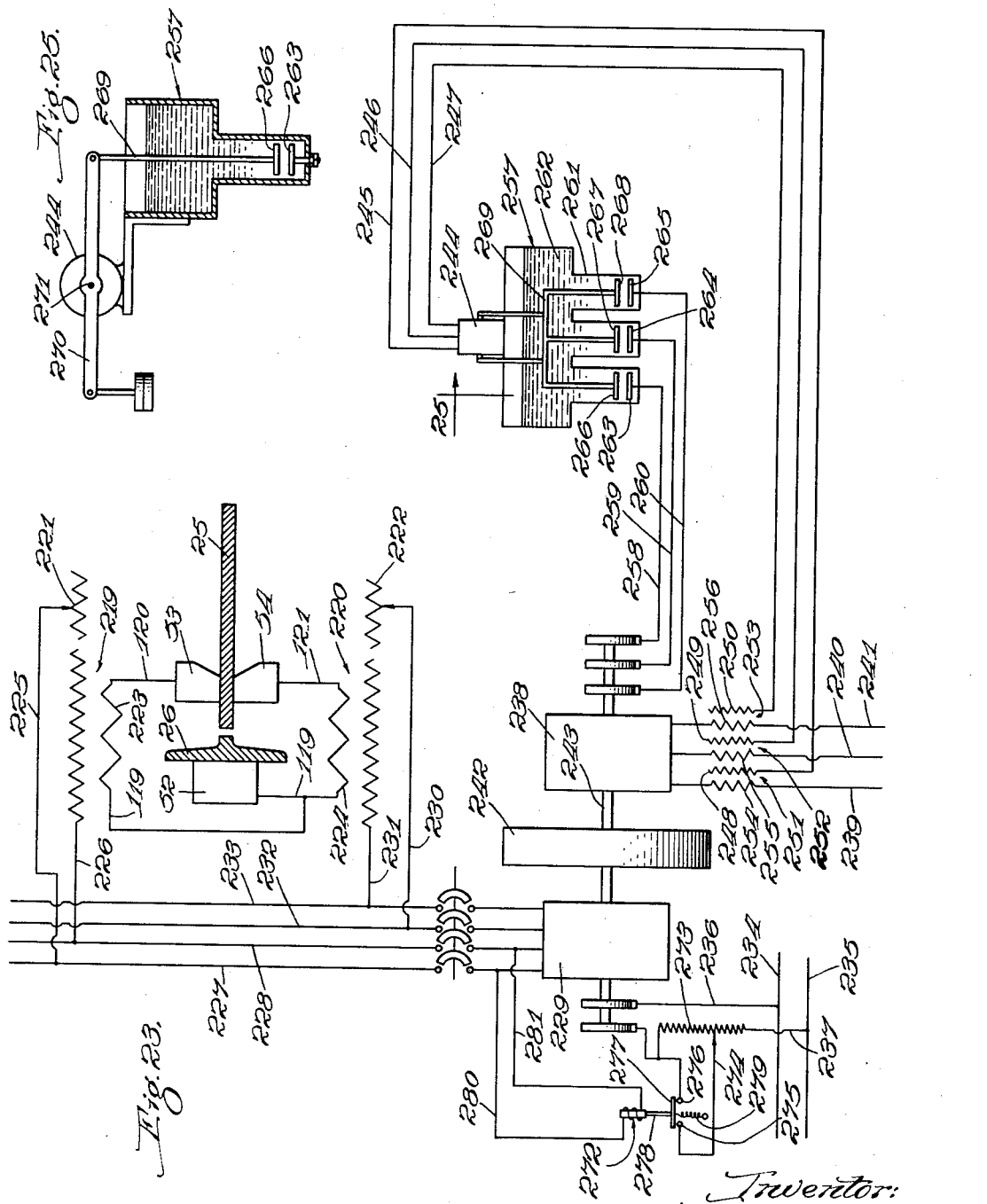

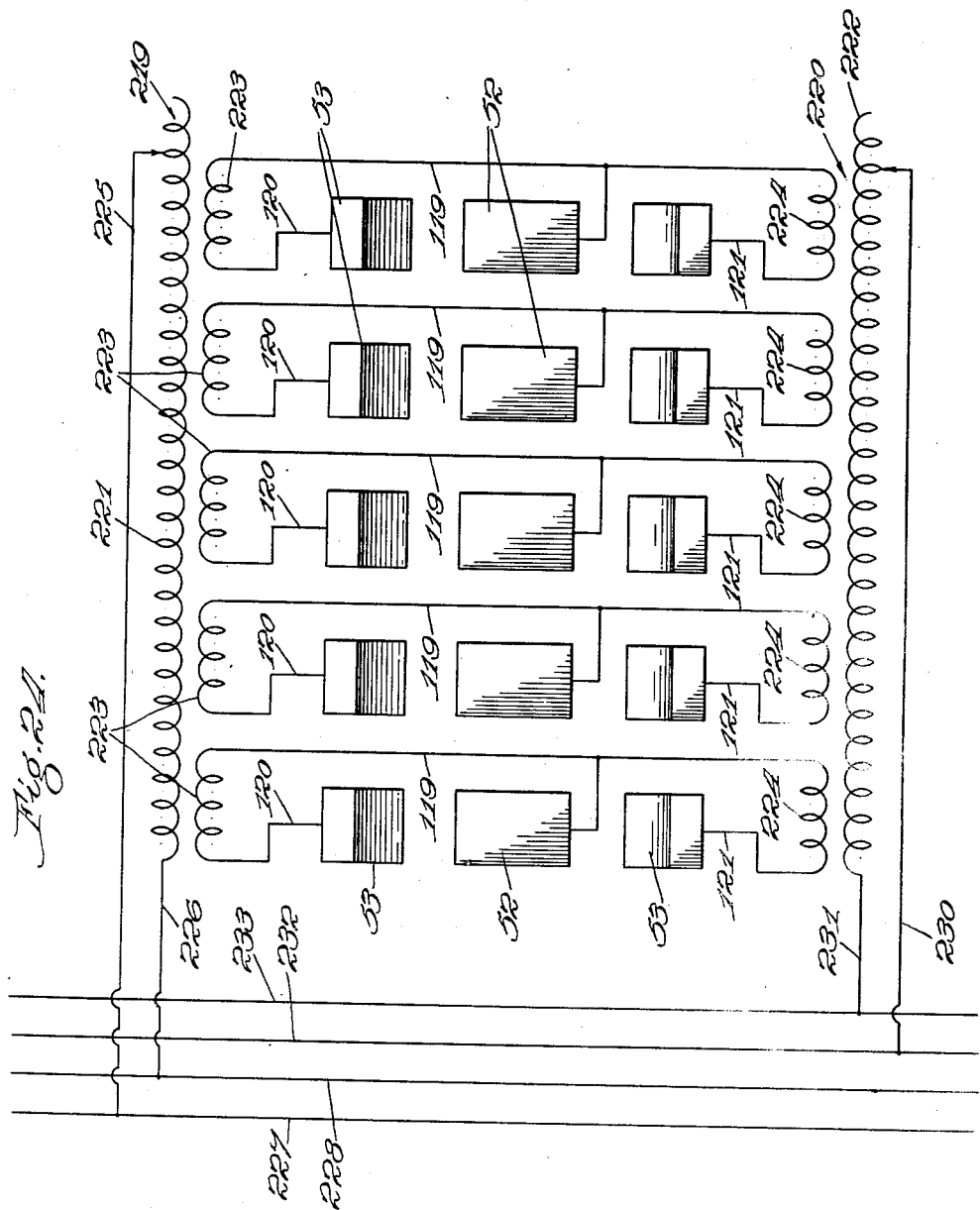

Patented Nov. 14, 1939

2,179,803

UNITED STATES PATENT OFFICE 2,179,803

APPARATUS FOR PRODUCING BEAMS, COLUMNS, OR THE LIKE

Wilfred Sykes, Flossmoor, Ill., assignor to Inland Steel Company, Chicago, Ill., a corporation of Delaware Application July 2, 1936, Serial No. 88,671

14 Claims. (Cl. 219—4)

My invention relates to the welding of articles, as for example and more particularly, built-up metal structures such as and more especially beams and columns comprising web and flange members, this application being in part a continuation of my application for United States Letters Patent Serial No. 740,346, filed August 17, 1934.

My object, generally stated, is to provide a novel, simple and highly satisfactory apparatus for producing such articles, of the type wherein the welding together of the parts to form the articles is produced while these parts are at rest. Certain more specific objects of the invention will be more apparent from the following description.

Referring to the accompanying drawings:

Figure 1 is a view in side elevation of the entering end of the apparatus and a portion of the welding mechanism constructed in accordance with my invention.

Figure 2 is a similar view of the run-out end of the apparatus and the adjacent portion of the welding mechanism.

Figure 3 is a plan view of the structure shown in Fig. 1.

Figure 4 is a plan view of the structure shown in Fig. 2.

Figure 5 is an enlarged sectional view taken at the line 5 on Fig. 3 and viewed in the direction of the arrow showing the operative parts of the welding mechanism in the positions they assume after the members to be welded together are introduced into this mechanism but before the clamping and welding operations, the work shown therein comprising a web-forming and a flange-forming member only.

Figure 6 is an enlarged sectional view taken at the line 6 on Fig. 3 and viewed in the direction of the arrow and showing the clamping and welding electrodes in operating position, the work shown therein comprising a web-forming portion to one edge of which a flange-forming portion has been welded, together with a flange-forming member to be welded to the opposite edge of the web-forming portion.

Figure 7 is an enlarged broken sectional view taken at a line corresponding with the line 6 on Fig. 3, the mechanism being conditioned for welding together the work shown in Fig. 5 and the clamping and electrode mechanisms being shown in operating condition.

Figure 8 is an enlarged broken section taken at the line 8 on Fig. 6 and viewed in the direction of the arrow.

Figure 9 is a section taken at the line 9 on Fig. 6 and viewed in the direction of the arrow.

Figure 15 is a sectional view taken through the feed-in table of the apparatus, the section being taken at the line 15 on Fig. 3 and viewed in the direction of the arrow.

Figure 16 is a sectional view taken through the run-out end of the apparatus, the section being taken at the line 16 on Fig. 4 and viewed in the direction of the arrow.

Figure 17 is a face view of one of the similar sectional flange-engaging supporting rollers, showing the sections thereon in separated condition.

Figure 18 is a view, in the nature of a diagram, showing certain of the various fluid-pressure-operated devices of the apparatus, together with the controlling means therefor.

Figure 19 is a sectional view of a valve device provided for selectively supplying either low pressure fluid or high pressure fluid to the fluid-pressure-operated devices of Fig. 18.

Figure 20 is a sectional view of a valve device controlling the supplying of fluid pressure to certain of the fluid-pressure-operated mechanisms of Fig. 18, showing the valve proper in one position.

Figure 21 is a similar view of the valve mechanism of Fig. 20 showing by dotted lines and by full lines two other positions to which the valve proper is operated in the control of the operation of the fluid pressure mechanisms of Fig. 18.

Figure 22 is a sectional view of a valve device controlling the supplying of fluid pressure to another of the fluid-pressure-operated mechanisms.

Figure 23 is a view, in the nature of a diagram, of electrical apparatus for supplying welding current to the welding mechanisms.

Figure 24 is a more detailed diagram of certain of the electrical connections typical of those for the several groups of electrodes; and Figure 25, an enlarged sectional view taken at the line 25 on Fig. 23 and viewed in the direction of the arrow.

Figure 10:
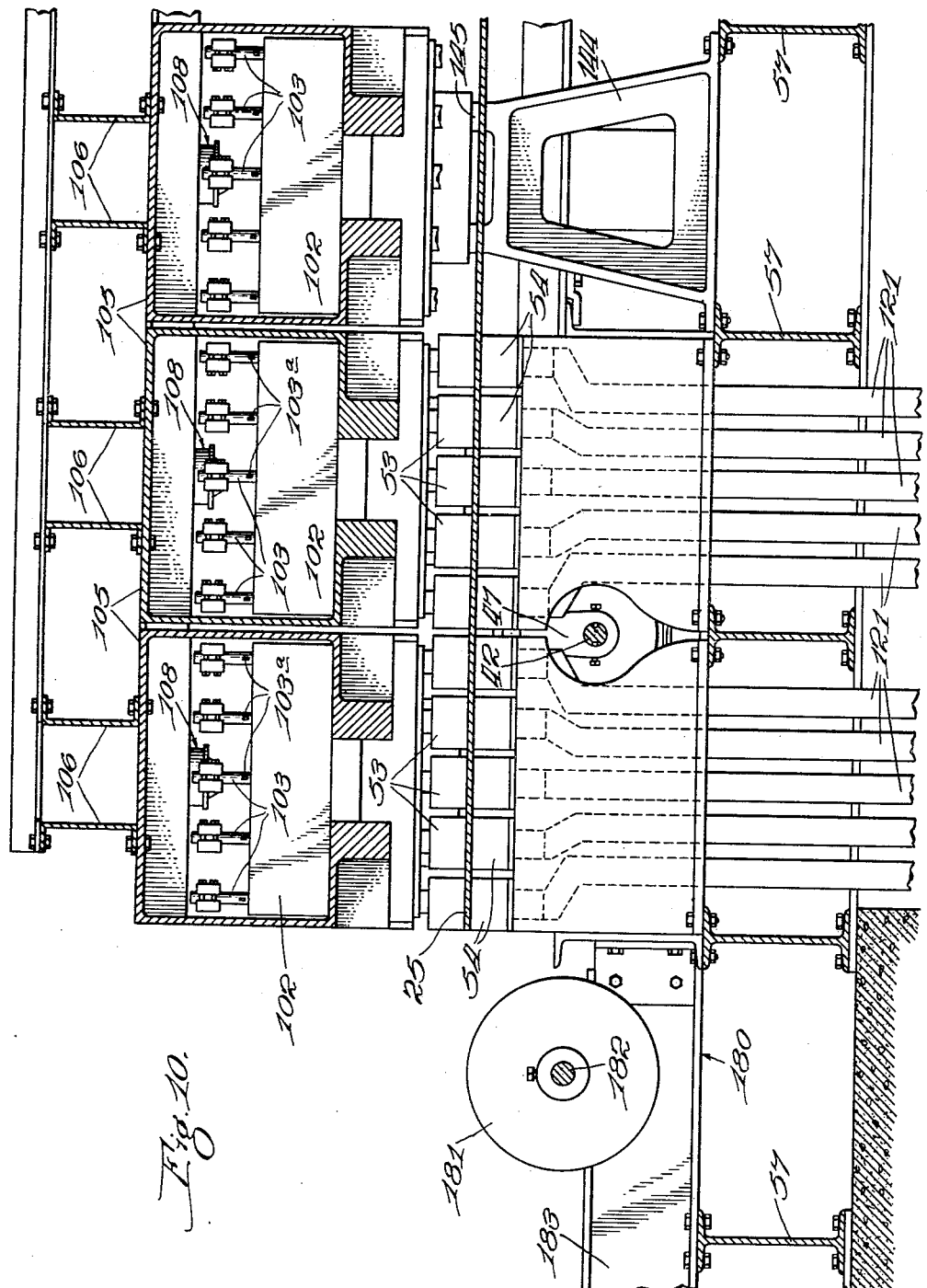
Figure 10 is a broken longitudinal section taken at the line 10 on Fig. 6 and viewed in the direction of the arrow.
Figure 11:
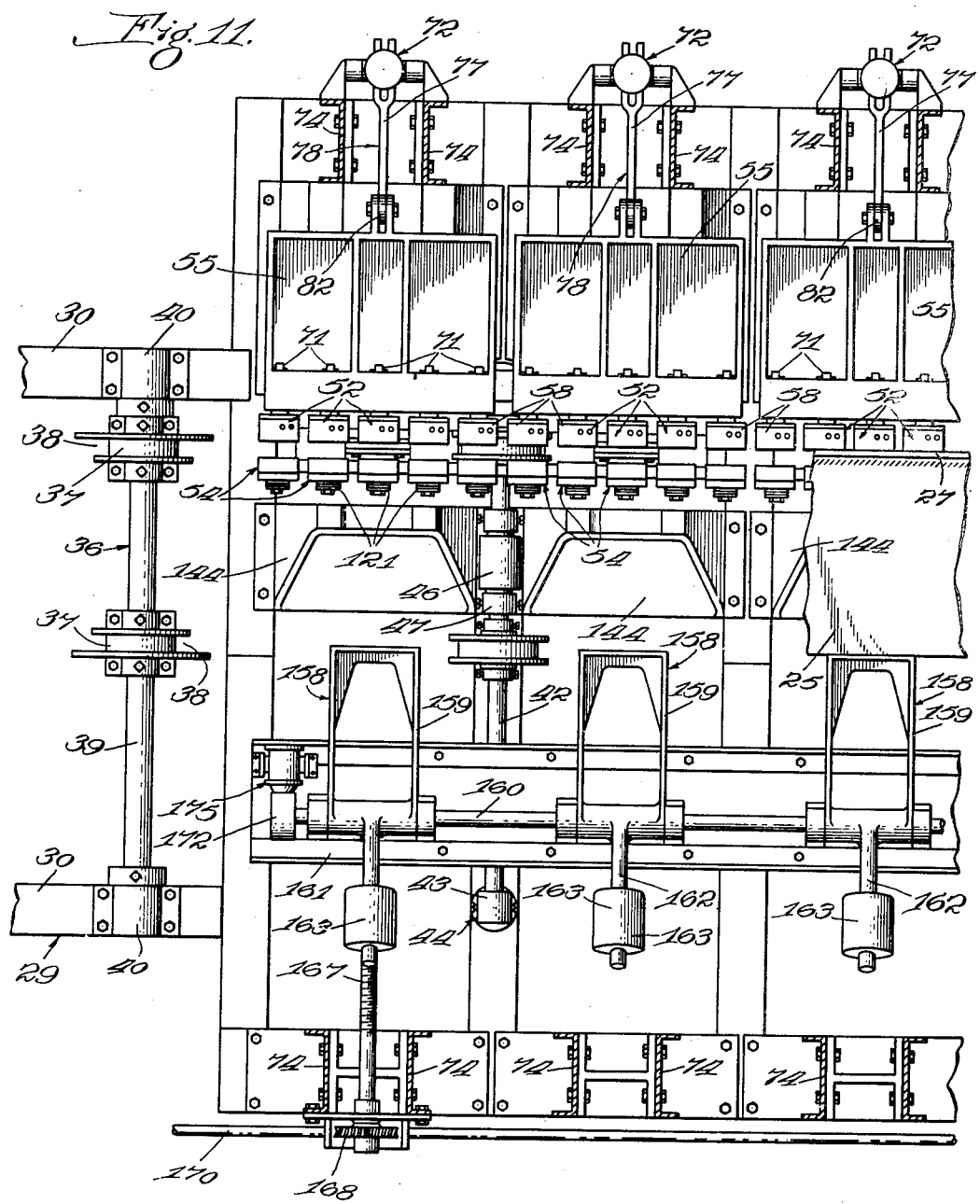
Figure 11 is a broken plan section taken at the irregular line 11 on Fig. 5 and viewed in the direction of the arrow.
Figure 12:
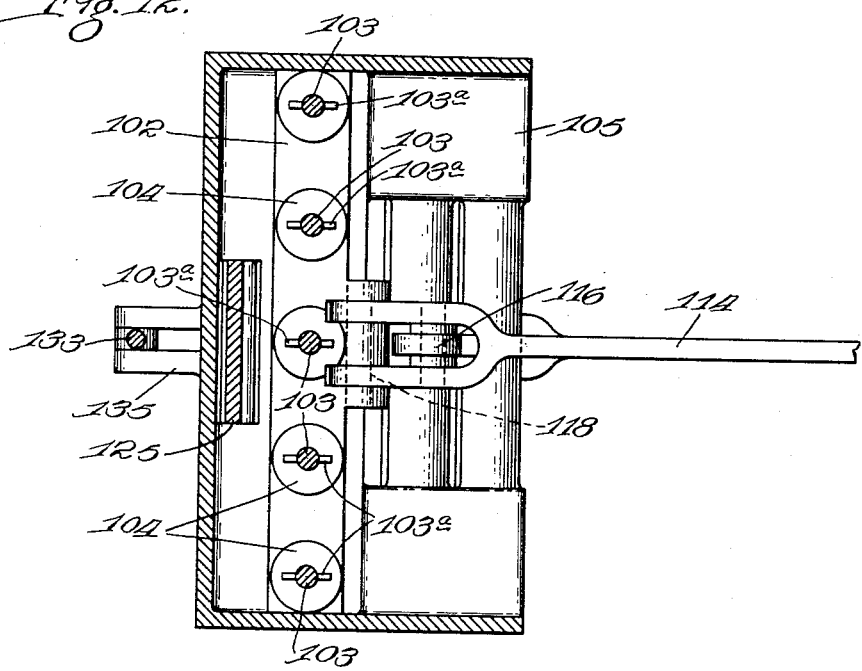
Figure 12 is a plan section taken at the irregular line 12—12 on Fig. 7 and viewed in the direction of the arrows.

As a preface to the following description of the particular illustrated apparatus, it may be stated that the particular apparatus shown is provided for the manufacture of beams, columns or the like of general I-shape in cross section (though the invention is not limited thereto) formed of a separate web-forming section represented at 25 and flange-forming sections represented at 26 and 27, each flange-forming section 26 and 27 being shown as provided along a face thereof with a rib 28 extending the full length of the section and equidistantly spaced from the longitudinal edges thereof and at which ribs the flange-forming sections 26 and 27 are welded to the opposite longitudinal edges of the web-forming sections 25, each rib 28 preferably being of a thickness substantially equal to the thickness of the web-forming section 25 and of a height not less than its thickness.

The particular apparatus shown and designed to effect the welding together of the members forming the beam or column, by a welding operation which in effect constitutes flash welding, the flange-forming sections being welded to the web-forming section, one at a time, comprises at the entering end thereof a table represented generally at 29, on which the web-forming section 25 and the flange-forming sections 26 and 27 are assembled preliminary to the feeding thereof through the apparatus.

The table 29 is shown as comprising spaced-apart beams 30 extending lengthwise of the apparatus and supported on cross beams 31; and horizontal roller mechanisms for supporting, respectively, the web-forming section 25 and the flange-forming sections 26 and 27.

The web-supporting roller mechanisms referred to (the one of which adjacent the welding mechanism is represented at 32) are arranged in a horizontal series disposed lengthwise of the table 29 and between the beams 30, and comprise rollers 33 supported on shafts 34 journalled at their ends in journal boxes 35 secured to the beams 30.

The flange-supporting roller mechanisms above referred to and represented generally at 36 and alternating with the web-supporting roller mechanisms 32, are arranged in a horizontal series disposed lengthwise of the table 29 and between the beams 30 and comprise rollers 37 the peripheries of which are annularly grooved as represented at 38, these rollers being mounted in pairs on shafts 39 alternating with the shafts 34 and journaled at their ends in journal boxes 40 carried by the beams 30. The rollers 38, which are located at opposite sides of the web-supporting rollers 33 as shown, are preferably formed of half-sections as shown in Fig. 17, secured together as by the bolts 41, the provision of these rollers as sectional structures as shown adapting them for quick attachment to, and detachment from, the shafts 39 which is especially desirable when substitution of different sized rollers, to accommodate flanges of different heights, is to be made.

As will be understood from the foregoing, the web and flange-forming sections 25, 26 and 27 are assembled together on the table 29 by positioning the web-forming section 25 flatwise upon the rollers 33 and the flange-forming sections 26 and 27 edgewise upon the grooved portions 38 of the rollers 37, with the ribs 28 extending inwardly toward the opposite edges of the web-forming section 25. It may be here stated, however, that, inasmuch as the flange-forming sections 26 and 27 are welded in succession and not at the same time to the web-forming section, the web-forming section 25 and the flange-forming section 26 only would be assembled as stated, in the initial assembling operation, and after welding these two parts together the welded structure would be removed from the machine and re-positioned on the assembling table to cause the web-forming section 25 to rest on the rollers 33 and the flange-forming section 26 to rest in the grooved portions of the rollers 38 on the middle portions of the shafts 39 and the other flange-forming section 27 applied to the grooved portions 38 of those of the rollers 37 at the outer ends of the shafts 39 (Fig. 15), and the work thus constituted run into the welding mechanism to weld these parts together.

Located adjacent to, and beyond, the table 29 is the welding portion of the apparatus which operates to weld the flange-forming sections 26 and 27 at their ribs 28 to the opposite longitudinal edges of the web-forming section 25, upon the delivery to the welding mechanism of the sections assembled on the table 29 as above stated.

Below the welding mechanism is a series of crosswise extending shafts 42 mounted at their ends in the upper vertically movable end portions 43 of jacks 44 shown as of the pneumatically operated type and which may be of any desirable construction. The shafts 42 are provided with peripherally grooved rollers 45 journaled thereon to receive the flange-forming sections 26 and 27, and with web-engaging rollers 46 journaled in yokes 47 secured to these shafts, the rollers 45 and 46 being in line with the rollers 38 and 33, respectively, and receiving the work as it is moved into position within the welding mechanism. The rollers 45 are shown as mounted between pairs of collars 48 adjustable lengthwise along the shafts 42 and held thereon by set screws 49 extending into grooves 50 in the shaft. The yokes 47 are held in the upwardly extending position shown by means of set screws 51 carried thereby and extending into the grooves 50.

The welding mechanism comprises sets of electrodes each consisting of a movable flange-engaging electrode 52, an upper movable web-engaging electrode 53 and a stationary lower web-engaging electrode 54. These various electrodes, composing the sets thereof as stated, are each arranged in a series extending lengthwise of the apparatus and in spaced apart relation and provided in such numbers as to cause each series thereof to be substantially of the same length as the length of the beam or column to be produced.

The flange-engaging electrodes 52 are provided in groups each shown as comprising five of these electrodes, each group of electrodes being carried by a ram 55.

The rams 55 are slidably mounted on hollow blocks 56 secured to cross beams 57 forming the lower members of the framing structure of the welding apparatus.

The electrodes 52 are formed of hollow work-engaging copper sections 58 having internal horizontal partitions 59 ported at 60 and dividing the space within the electrode into upper and lower chambers 61 and 62 connected, respectively, with cooling-fluid inlet and outlet flexible pipes 63 and 64 leading to cooling liquid feed and return lines 65 and 66, respectively. The electrodes 52 also comprise stem sections 67 connected with, and electrically insulated from, the electrode sections 58, these stems 67, which are square, as shown, sliding in sockets 68 in the rams 55. Coiled springs 69 in the sockets 68 and engaging the stem sections 67 exert outward pressure against the electrodes 58 which are prevented from becoming displaced from the sockets 68 by pins 70 on the reduced end portions 71 of the stem sections 67, the springs 69 being preferably under initial compression, and so held, by the pins 70, in the normal, inoperating position of the parts of the apparatus.

The rams 55 are operated to move the electrodes 58 toward and away from the line of travel of the work by fluid-pressure-operated mechanism comprising piston and cylinder devices 72 horizontally pivoted at their cylinder portions, as represented at 73, to brackets on certain of uprights 74 rising from the cross-beams 57. The piston rods 75 of these mechanisms are connected adjustably at 76 with the outer ends of arms 77 of bell crank levers 78 pivoted at 79 to the outer ends of links 80 pivoted at their inner ends to the blocks 56 at 81, the other arms 82 of these bell cranks being pivoted at 83 to the rams 55 which latter are guided in their movement by ribs 84 on the upper faces of the blocks 56 which extend into grooves 85 in the bottom faces of the rams 55. Pins 86 on tongues 87 depending from the rams 55 between pairs of tongues 88 on the blocks 56, the pins 86 extending into slots 89 in the tongues 88, hold the rams 55 against accidental upward displacement.

The lower electrodes 54 which are stationary and formed of copper are of hollow construction to afford cooling-liquid chambers 90 to which flexible feed and return pipes 91 and 92 are connected, these pipes connecting with cooling-liquid feed and return lines 93 and 94, respectively.

The upper electrodes 53 are also of hollow construction to present cooling-liquid chambers 95 connected by flexible pipes 96 and 97 with cooling-liquid feed and return pipes 98 and 99, respectively, and are vertically slidable at their upper ends in socket bushings 100 of current insulating material seated in the lower ends of vertical bores 101 formed in vertically slidable blocks 102. The electrodes 53 have upwardly extending stems 103 which extend through the bores 101 and slide in the bushings 100 and in bushings 104 at the upper ends of the bores 101. Coil springs 53ᵃ in the bushings 100 and engaging the electrodes 53 tend to yieldingly press these electrodes in an outward and downward direction, these springs being preferably under initial compression, and so held, by pins 103ᵃ, in the normal, inoperative, position of the parts of the apparatus.

The electrodes 53 are shown as grouped relative to the blocks 102, each block 102, in the particular construction shown, being provided with five of the electrodes 53.

The blocks 102 are slidably mounted in housings 105 secured to upper cross beams 106 connected with the upper ends of the uprights 74, each housing containing a vertical guide opening 107 in which the block 102 associated therewith is movable vertically.

The blocks 102, together with the parts carried thereby including the electrodes 53, are movable vertically by fluid-pressure-operated mechanisms, the piston and cylinder devices 108 of which are horizontally pivoted at their cylinders 109 to brackets 110 depending from the upper cross beams 106, as indicated at 111. The piston rods 112 of these mechanisms are pivotally connected at 113 with the outer ends of levers 114 fulcrumed at 115 on the upper ends of links 116 pivoted at 117 to the housings 105, the inner ends of these levers being pivoted at 118 to the upper ends of the blocks 102.

Each of the electrodes 52, 53 and 54 is connected with a current conducting lead through which current is supplied as hereinafter explained, the leads for these several electrodes being represented at 119, 120 and 121, respectively.

Associated with the welding mechanism are clamp mechanisms for clamping down on the upper edges of the flange-forming sections of the work; clamp mechanisms for clamping the web-forming section of the work; and gage, or side guard, devices for the edge of the work opposite that at which the weld is being made, a description of these mechanisms being as follows:

The flange-clamping devices comprise a horizontal series of substantially vertical, end-to-end, arranged spaced-apart spring-plates 122 secured at their lower edges to plate members 123 carried by the lower cross beams 57 and on which the electrodes 54 are supported and insulated therefrom as shown. The plates 122 which are insulated from the plates 123 as shown, press at their upper edges, preferably so treated as to render them heat resisting as is well known in the art, against the inner face of the flange-forming member and engage with the underside of the rib 28 thereon. These plates have plate portions represented at 124 which are offset laterally from the upper edges of the plates 122 and form recesses into which the lower edge of the flange-forming section extends, with this section in engagement with the plates 124 as shown.

These flange-clamping devices also comprise a horizontal series of substantially vertical vertically movable plates 125 having their lower edges notched as represented at 126, with a lining 127 of current insulating material, at which these plates are adapted to bear down on the upper edge of the flange-forming section.

The plates 125, one provided for each housing 105, guidingly extend at their upper ends between guide walls 128 presented by the housings 105 and lapping lugs 129 (Figs. 7 and 8) on these housings. The plates 125 are pivoted at 130 to levers 131 fulcrumed at 132 on the upper ends of adjustable links 133 pivoted at their lower ends, as represented at 134, to brackets 135 on the housings 105. The outer ends of the levers 131 are pivotally connected at 136 with the piston stems 137 of fluid-pressure-operated piston and cylinder mechanisms 138 the cylinders 139 of which are horizontally pivoted at 140 on the upper cross beams 106.

The plates 125 which are relatively narrow slide in horizontally restricted upper and lower guide openings 141 and 142 in the housings 105 and are restrained against swinging away from the flange-forming section, namely, to the left in Fig. 6, by webs 143 formed as parts of the housings 105.

The clamp mechanisms for clamping the web-forming section 25 comprise a horizontal series of stationary clamp elements 144 secured to the lower cross beams 57, and a horizontal series of upper clamp elements 145 disposed directly above the clamping elements 144 and vertically movable into and out of clamping position. The elements 145 are guided for vertical movement in openings 146 in the housings 105 and are operated by fluid-pressure-operated piston and cylinder mechanisms 147 the cylinders 148 of which are horizontally pivoted, as indicated at 149, to brackets 150 depending from the upper cross beams 106, the piston rods 151 of these mechanisms being pivoted at 152 to the outer ends of levers 153 fulcrumed at 154 to the lower ends of links 155 pivoted at their upper ends at 156 on the housings 105, the inner ends of these levers being pivotally connected at 157 to the clamp elements 145.

The gage devices above referred to and represented generally at 158 comprise gaging elements 159 connected to a shaft 160 journaled in a carriage 161 extending lengthwise of the apparatus, the gaging elements 159 having arm extensions 162 carrying sliding counterbalancing weights 163.

Figure 13:
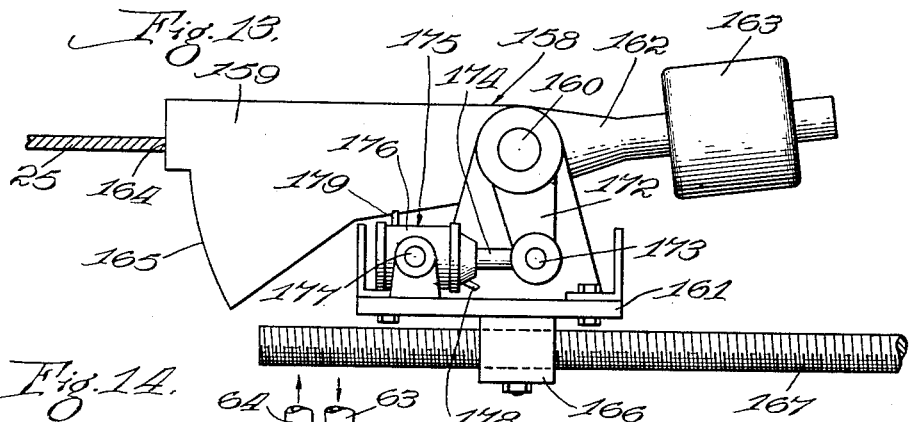
Figure 13 is a view in elevation of one of the similar duplex side-guards, or gages, forming parts of the apparatus.
Figure 14:
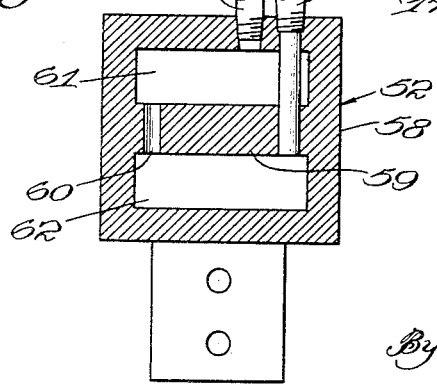
Figure 14 is a vertical sectional view of one of the similar flange-engaging electrodes of the apparatus.

The elements 159 oppose the edge of the work opposite that at which the weld is being effected and the faces thereof at which they engage the work are stepped as represented to provide on each element two faces 164 and 165, the face 165 being set back from the face 164. The face 164 is provided to engage the adjacent edge of the web-forming section 25 in the operation of welding the first flange-forming section 26 thereto (Figs. 5 and 13); and the face 165 is provided to engage the outer face of the first flange-forming section 26 welded to the web-forming section 25 (Fig. 6); these faces being so disposed, as shown, that in both the first and second welding operations referred to, assuming the carriage 161 to have been properly preliminarily adjusted for the particular height of beam or column to be produced as by the means hereinafter described, the work will be properly positioned in the apparatus for the proper functioning of the electrode and clamping mechanisms above described.

The carriage 161 carries nuts 166 at intervals therealong in which threaded shafts 167 journaled on the frame of the apparatus, and extending crosswise thereof, are screwed, each shaft 167 having a spiral gear 168, these gears meshing with worms 169 on a shaft 170 journaled in the frame of the apparatus and driven in either direction, selectively, by a reversible motor 171 connected therewith, with a speed-reducing mechanism 170ᵃ interposed, whereby all of the gage elements 159 may be simultaneously adjusted crosswise of the apparatus by rotating the shaft 170 to adapt the apparatus for operation on work of different widths.

The shaft 160 is provided with a rigid arm 172 pivoted at 173 to the piston stem 174 of a fluid-pressure-operated piston and cylinder mechanism 175, the cylinder 176 of which is trunnioned at 177 on one of the end carriages 161. Fluid pressure for rocking the shaft 160 and with it the gaging elements 159 into either of the positions shown (Figs. 5, 6 and 13) is admitted to the cylinder 176 through a pipe 178 or 179 at opposite ends of the cylinder, depending on the direction in which the shaft 160 is to be rocked.

The welding operation is effected by causing an electric current of suitable strength to pass between the electrodes and through the interposed flange-forming section and web-forming section while forcibly pressing the flange-forming section at its rib 28 against the adjacent longitudinal edge of the web-forming section 25.

Beyond the welding mechanism is a table represented at 180 and having work supporting rolls 181 mounted on shafts 182 journaled on girders 183 supported on the lower cross beams 57, to receive the work after the welding operation has been performed.

In the use of the apparatus the web-forming section 25 and the flange-forming section 26 are assembled on the table 29, the section 25 resting flatwise on the rollers 33 and the section 26 edgewise on the rollers 38 at the middle of the shafts 39, with the rib 28 of section 26 extending toward the section 25. These sections are then fed into the clamp and welding mechanisms described (the electrodes 52 and 53 and the clamp elements 125 and 145 being in retracted position and the gage devices 159 conditioned to present their faces 164 to the adjacent edge of the web-forming section 25) to become supported on the rollers 45 and 46 which are in the raised position shown in Fig. 5.

The jacks 44 are then manipulated to lower the shafts 42 thus withdrawing the rollers 45 and 46 from engagement with the sections 25 and 26, which causes the section 25 to rest on the clamp elements 144 and the section 26 to rest on the member 122, in which position these sections are properly alined. The mechanisms 147, 72 and 138 are then actuated to force the clamping elements 145 against the web-forming section 25, and the electrodes 52 and the clamping elements 125 inwardly and downwardly, respectively, against the section 26. The electrodes 53 are then forced downwardly against the section 25 by operating the mechanisms 108. Current is then supplied to the electrodes 52, 53 and 54 to weld the sections 25 and 26 together.

During the welding operation the operating pressures for the clamp and electrode mechanisms referred to, continue to function and as the metal at the joint between the sections 25 and 26 softens the continuing force exerted by the electrodes 52 causes the section 26 to move bodily inwardly toward the section 25 with the necessary pressure against the section 25 for producing the weld. The springs 69 serve primarily to insure the contacting of each electrode 52 with the section 26 under substantially the same pressure regardless of slight variations in beam section and such unevennesses or irregularities as may be presented on the outer face of this section. A similar function is performed by the springs 53ᵃ operating in conjunction with the electrodes 53.

Inasmuch as the plates 122 are of springy material and the clamping plates 125 are pivotally hung at 130 from the levers 131, these parts maintain their operative positions relative to the flange-forming section during the movement of the latter toward the web section 25 under the pressure exerted against the flange-forming section by the electrodes 52 as they move toward the web-section 25 as above described.

It may be here stated that the leverage exerted by the mechanisms 147 on the clamp elements 145 is preferably sufficiently greater than that exerted by the mechanisms 72 on the electrodes 52 as to insure the holding of the section 25, during the welding operation, against lateral displacement.

Following the welding of the section 26 to the section 25 as stated the partially formed beam or column, when an I-beam is to be produced, is removed from the apparatus and assembled on the table 29 with the other flange-forming section 27 as shown in Fig. 15, and the assembly then fed into the clamping and welding mechanisms for support on the rollers 45 and 46 (these rollers being in raised position) the gage devices 159 being manipulated to cause their surfaces 165 to oppose the outer face of the section 26. The clamping and electrode positioning operations, as above described, are again performed to weld the section 27 to the united web and flange sections 25 and 26 as above explained as to the welding of the sections 25 and 26 together.

In the welding together of the sections 25, 26 and 27 as above described, beads, represented at 184, are formed (by upsetting of the adjacent edges of the metal sections under the pressure exerted by the electrodes 52) at opposite faces of the web-forming section 25 at the joints between the latter and the flange-forming sections 26 and 27, which it is desired be eliminated in the finished structure. This may be accomplished in any desirable way, as for example by a rolling, machining, or grinding operation.

The supplying of operating pressures to the mechanisms 72, 108, 138 and 147 is preferably accomplished by the particular controlling mechanisms shown more particularly in Figs. 18-22 which serve, by the operation of a single control valve to simultaneously actuate the mechanisms 72, 138 and 147 for moving the electrodes 52 against the flange sections and applying the clamps 125 and 145, provision being made for the initial movement of these parts to operating position under the action of relatively slight force only, followed by the application of much greater force to cause them to press against the work with the pressures desired during the welding operations.

The controlling mechanism referred to comprises a pipe 185 leading from any suitable source of fluid-pressure-supply and opening into the casing 186 of a valve device 187, the valve proper of which is represented at 188. The valve proper 188 which is rotatable contains a through passage 189 adapted to connect the pipe 185 with either one of two pipes 190 and 191 opening into the casing 186 and connected with a pipe 192, the pipe 190 containing a pressure reducing valve mechanism represented generally at 193. Thus, by this arrangement fluid under either high pressure or low pressure, as desired, may be supplied to the controlling system, the valve proper 188 being weighted at 194 to cause it normally to be in a condition for supplying fluid at low pressure to the system.

The pipe 192 opens into the casing 195 of a control valve device 196, the interior of this casing communicating with three pipe mains 197, 198 and 199 and containing an exhaust port 200.

The pipe main 197 extends along the several mechanisms 72 and 138 and connects by flexible branch pipes 201 and 202 with the tops of the cylinders of all of the mechanisms 72 and 138, respectively. The pipe main 197 also connects with a pipe main 203 which extends along the mechanisms 147 and connects with the tops of the cylinders of all of the mechanisms 147 by flexible branch pipes 203ª.

The pipe main 198 extends along the several mechanisms 138 and connects by flexible branch pipes 204 and 205 with the bottoms of all of the cylinders of the mechanisms 72 and 138, respectively.

The pipe 199 extends lengthwise along the mechanisms 147 and connects by flexible branch pipes 206 with the lower ends of the cylinders of all of the mechanisms 147.

The valve proper of the valve device 196 which is rotatable and represented at 207 is preferably of the shape shown (Figs. 20 and 21), whereby in one position (Fig. 20) fluid pressure is supplied to the pipe main 197 only and both of the pipe mains 198 and 199 are open to exhaust through the port 200 and thus the pistons of all of the mechanisms 72, 138 and 147 are forced downwardly to retract the electrodes 52 and the clamping elements 125 and 145.

Upon rotating the valve proper 207 in counter-clockwise direction in Fig. 20 to the dotted line position shown in Fig. 21, the pipe main 197 becomes closed to the supply of fluid pressure and opened to the exhaust port 200 and the pipe main 199 becomes opened to the supply and thus the pistons of the mechanisms 147 are forced upwardly to move the clamping elements 145 downwardly into positions in which they bear against the work.

Continued rotation of the valve proper 207 to the full line position shown in Fig. 21 also opens the pipe main 198 to the supply of fluid pressure whereupon, while the clamping elements 145 remain in operating position, the pistons of the mechanisms 72 and 138 are forced upwardly to force the electrodes 52 and the clamping elements 125 against the work. Upon returning the valve proper 207 to normal position (Fig. 20) fluid pressure enters the tops of the cylinders of all of the mechanisms 72, 138 and 147, as hereinbefore described, and the electrodes 52 and the clamping elements 125 and 145 are thereby retracted.

It may here be stated that in the operation of the apparatus fluid at low pressure is used for the movement of the electrodes 52 and clamping elements 125 and 145 into position against the work preliminary to the welding operation (and also to retract these parts after the welding operation) the valve proper 188 being in the position shown by full lines in Fig. 19; but after these parts have been moved into engagement with the work the high pressure fluid for pressing these electrodes and clamping devices against the work during the welding operation, is supplied by rotating the valve proper 188 to the dotted position shown in this figure.

The supplying of actuating fluid pressure to the mechanisms 108 which it is intended be operated to position the electrodes 53 against the work after the electrodes 52 and clamping elements 125 and 145 have been applied to the work as stated, may be effected through the system shown and comprising a pipe 208 leading from any suitable source of high pressure fluid and opening into the casing 209 of a valve device 210 the valve proper of which, represented at 211, is rotatable. The valve proper 211 has two separate through passages 212 and 213 therein arranged as shown and the casing 209 has an exhaust port 214 and communicates with two pipe mains 215 and 216, the passages 212 and 213 and the pipes 215 and 216 being so disposed as shown that in one position of the valve proper 211 (Fig. 22) the pipe main 215 is open to the supply pipe 208 and the pipe main 216 communicates with the exhaust port 214, and in the other position of this valve the inlet pipe 208 is open to the pipe main 216 and the pipe main 215 communicates with the exhaust port 214.

The pipe mains 215 and 216 extend along the mechanisms 108, the pipe main 215 being connected by flexible branch pipes 217 with the upper ends of the cylinders of all of the mechanisms 108, and the pipe main 216 connecting, by flexible branch pipes 218, with the lower ends of all of these cylinders. Thus by manipulating the valve device 210 the electrodes 53 may be moved into and out of operating position at will.

Current may be supplied in any suitable way, to the welding electrodes described, as for example in accordance with the arrangement shown in Figs. 23 and 24.

In this arrangement wherein alternating current is used, the several electrodes 52 are connected with the electrodes 53 and 54 of the several sets thereof, respectively, through the secondary windings of step-down transformers. A pair of these transformers is provided for each group of electrodes 52 (comprising in the apparatus illustrated five of these electrodes) and their group of cooperating electrodes 53 and 54, each transformer, which would be located closely adjacent to the particular set of electrodes supplied with current therefrom, having multiple secondary windings of a number corresponding with the number of electrodes comprising the groups referred to, namely, five in the particular arrangement shown, these multiple windings being connected with the sets of electrodes 52, 53 and 54, formed of one each. The transformers referred to for one group of the electrodes 52 and their cooperating electrodes 53 and 54 are represented at 219 and 220, their primary windings at 221 and 222, respectively, and their multiple secondary windings at 223 and 224, respectively, this construction and arrangement being typical for all groups of electrodes 52 and their cooperating electrodes 53 and 54. The primaries 221 of the several transformers 219 connecting together the electrodes 52 and 53 of the several groups are connected in parallel, by current conductors 225 and 226 with the leads 227 and 228 from a polyphase alternating current generator 229; and the primaries 222 of the several transformers 220 connecting together the electrodes 52 and 54 of each of the several groups are connected in parallel, by current conductors 230 and 231, with the other leads 232 and 233 from the generator 229, the leads for supplying direct exciting current from direct current line conductors 234 and 235, to the generator 229, being represented at 236 and 237.

The generator 229 is driven by a motor represented at 238 and which may be either a direct current motor or an alternating current motor of the induction type, the latter type being illustrated and the conductors through which current is supplied to the motor being represented at 239, 240 and 241.

As the power required during the welding operation may amount to many thousands of kilowatts for a few seconds only, whereas the power required for driving the generator during the relatively long intervals between welding operations is very small, and as it is desirable that the demand upon the power system supplying the current for operating the motor 238 be maintained as low as possible, I provide means whereby when the load on the line leading to the motor 238 reaches a predetermined value, following the initiating of the welding, the current flow to the motor 238 will be automatically reduced and the energy for maintaining the generator 229 at the desired speed for finishing the welding operation, supplied by a fly-wheel represented at 242 connected with the shaft 243 by which the generator 229 is driven, the flywheel being gradually brought up to the requisite speed by the motor 238 during the relatively long intervals between the welding operations and during which intervals the minimum load is imposed on the motor.

The dropping in speed of the motor 238 may be effected by any suitable means such as any of those well known in the art; the means shown involving the use of a torque motor represented at 244 supplied with current through current conductors 245, 246 and 247 connected with the secondaries 248, 249 and 250 of series transformers 251, 252 and 253, respectively, the primaries 254, 255 and 256 of which are interposed in the line conductors 239, 240 and 241 leading to the motor 238; and an adjustable liquid resistance represented generally at 257 connected with the leads 258, 259 and 260 from the rotor of the motor 238 and controlled by the torque motor 244.

The adjustable liquid resistance 257 comprises a tank 261 containing any suitable liquid represented at 262 in which three sets of electrodes each comprising a lower electrode and an upper electrode, are immersed, the lower electrodes represented at 263, 264 and 265 being connected, respectively, with the conductors 258, 259 and 260 and the upper electrodes represented at 266, 267 and 268 electrically connected together by a frame represented at 269 and movable vertically into and out of contact with the lower electrodes 263, 264 and 265. The frame 269 is connected with one end of a lever 270 fixed on the shaft 271 of the torque motor 244, the arrangement being such that the upper electrodes 266, 267 and 268 normally contact with the lower electrodes 263, 264 and 265, respectively, and are raised out of contact therewith, to interpose resistance into the secondary circuit of the motor 238 thereby slowing it down, when the current supplied to this motor reaches a predetermined value.

As will be understood, when the welding load is removed, the current to the torque motor 244 becomes reduced and the electrodes of the adjustable liquid resistance 257 come together, thus causing the motor generator set to increase in speed and store energy in the fly-wheel 242 to render it available for use, as above stated, in the next welding operation.

Means of any suitable construction are provided for maintaining the voltage, supplied by the generator 229, substantially constant during the welding operation, in spite of the deceleration of the generator during the latter portion of the welding cycle.

The particular means shown for this purpose and well known in the art for maintaining constant voltage, involves the basic idea of the "Tirrill" regulator, and comprises a relay 272 operative to control the cutting of the resistance into and out of the exciter circuit 236 and 237 responsive to the voltage supplied by the generator.

The resistance referred to is represented at 273 and is interposed in the conductor 237, with a shunt circuit 274 which, when closed, cuts out a part of the resistance 273.

Interposed in the shunt circuit are the spaced contacts 275 and 276 of the relay 272 which cooperate with a bridging contact plate 277 on the movable core 278 of the relay, the core 278 connecting with an adjusting spring 279 to render the relay adjustable. The coil of the relay is shown as in circuit with the leads 227 and 228, by conductors 280 and 281.

The relay 272 is so adjusted that if the voltage supplied by the generator 229 reaches a predetermined value contact 277 rises and all of the resistance 273 is cut into the exciter circuit. When the voltage drops below this value the contact 277 engages the contacts 275 and 276 thus short circuiting a part of the resistance 273. With all of the resistance 273 in circuit the voltage of the generator 229 will be below the predetermined value and when part of the resistance is short circuited by the relay 272 the voltage will exceed the desired value. Thus the relay 272 will vibrate and the average excitation of the exciter circuit of the generator will maintain the desired voltage at the generator terminals independently of the speed of the generator.

It will be understood that the sets of electrodes 52, 53 and 54 in practice would be spaced sufficiently closely along the work that the welding effect of the current will be exerted against the work along its entire length to produce a continuous weld from end to end of the beam or column.

In further explanation of the operation of the electrode and clamping element actuating mechanisms it may be stated, by way of example, that the low pressure fluid initially supplied to the mechanisms 72, 138 and 147 as stated, may be in the order of that required to exert a pressure by the electrodes 52 and clamping elements 125 and 145 of from about 20 to 50 pounds per square inch and that the high pressure fluid employed as stated may be in the order of that required to exert a pressure by these electrodes and clamping elements of from about 1,000 to 1,200 pounds per square inch depending on the depth of the beam or column to be produced.

By initially operating these mechanisms by low pressure fluid the thrust exerted by the electrodes 52 is sufficient to overcome the resistance between the clamping elements 145 and the work and thus if the edge of the work, in the initial positioning of the latter in the apparatus, does not properly engage the gauging devices 159 the thrust of the electrodes 52 will insure the shifting of the work into proper contact with these several gauging devices. However, when the high pressure fluid is supplied to the mechanisms 72, 138 and 147 as stated, the clamping effect of the elements 145, particularly in view of the relatively great leverage exerted against these elements by the leverage system shown, is sufficient to rigidly hold the work against lateral movement under the thrust of the electrodes 52 and furthermore prevents any tendency to buckling of the web section 25 which might otherwise occur when relatively wide webs are used.

Furthermore, it is desirable that the clamping elements 125 be lowered into pressure contact with the flange forming sections before the electrodes 52 start to exert pressure against these flange sections, to insure the proper alignment of the ribs 29 and the web forming section 25 before pressure is exerted by the electrodes 52 on the work; this being provided for in the arrangement shown by providing the branch pipes 204 of considerably greater length than the branch pipes 205 whereby a somewhat delayed action of the mechanisms 72 result.

As will be understood by those skilled in the art, it is necessary that the amount of pressure exerted by the flange electrodes 52 against the work, the duration of the applied pressure and the length of stroke of these electrodes be varied where metal parts of different thicknesses are to be welded together and beams or columns of different depths produced, in order that the metal at opposite sides of the joints to be welded present the requisite zones or layers of metal heated to the welding temperature, concurrently with the movement of the flange section of the work, toward the web section, into the final position necessary to produce a beam or column of the desired depth, at which time the current is shut off permitting the metal at the joint to set. In the illustrated apparatus the length of stroke of the electrodes 52 is provided for by the engagement of the pistons of the mechanisms 72 with the tops of the cylinders thereof, the length of stroke being varied for metal of different thicknesses by adjusting the piston rods 75 along the arms 77 of the levers 78, the rods 75 being adjusted toward the outer ends of these arms to lengthen the stroke which is desirable when the metal is thicker. The timing of the stroke of the electrodes 52 may be regulated in any desirable way, as for example by providing in each branch pipe 204 a regulating needle valve such as that represented at 204$^a$, which merely controls the amount of fluid pressure supplied to the mechanisms 72 per unit of time without reduction of the pressure supplied to the devices 204$^a$; and any suitable means (not shown) for varying the pressure at which the operating fluid is supplied to the valves 204$^a$, may be provided.

While I have illustrated and described a particular construction of apparatus embodying my invention I do not wish to be understood as intending to limit it thereto, as the same may be variously modified and altered and the invention embodied in other forms of structure without departing from the spirit thereof, it being my intention to claim my invention as fully and completely as the prior state of the art will permit.

What I claim as new, and desire to secure by Letters Patent, is:

1. Welding mechanism for welding together sidewise disposed separate elements comprising longitudinal series of individual electrodes for engaging said elements at opposite sides of the joint, means for yieldingly and individually pressing said electrodes against said elements, and means for supplying welding current to said electrodes.

2. Welding mechanism for welding together sidewise disposed separate elements comprising longitudinal series of electrodes for engaging said elements at opposite sides of the joint, supports for said electrodes, means for moving certain of said supports toward and away from the work, means on said supports for yieldingly pressing said electrodes against the work and means for supplying welding current to said electrodes.

3. Welding mechanism for welding together members from which the web-portion and a flange portion of a beam are to be formed and disposed in angular relation to each other comprising longitudinal series of electrodes for engaging faces of said members at opposite sides of the joint, supports for said electrodes, means for moving certain of said supports toward and away from the work, means on said supports for yieldingly pressing said electrodes against said members and means for supplying welding current to said electrodes.

4. Welding mechanism comprising longitudinal series of electrodes certain of which are disposed at opposite sides of one of the members to be welded together and the other series of which engages the other of said members, said series of electrodes being relatively movable to force said members together, and gauging means engageable by said first-referred-to member and operative during the welding operation to prevent shifting of said first-referred-to member.

5. Welding mechanism comprising longitudinal series of electrodes certain of which are disposed at opposite sides of one of the members to be welded together and the other series of which engages the other of said members, said series of electrodes being relatively movable to force said members together, and adjustable gauging means engageable by said first-referred-to member and operative during the welding operation to prevent shifting of said first-referred-to member.

6. Welding mechanism comprising supporting means for the work formed of pieces to be welded together adapted to be withdrawn from supporting position, means clampingly supporting the work in the withdrawn position of said supporting means, and means for applying welding current to said pieces and forcing them into welding engagement with each other.

7. Welding mechanism comprising supporting means for members from which the web portion and a flange portion of a beam are to be formed and disposed in angular relation to each other, said means being adapted to be withdrawn from supporting position, means clampingly supporting said web-forming member in the withdrawn position of said supporting means, means supporting said flange-forming portion in the withdrawn position of said supporting means, and means for applying welding current to said members and forcing them into welding engagement.

8. Welding mechanism comprising supports for members, respectively, from which the web portion and a flange portion of a beam are to be formed and disposed in angular relation to each other, said support for said flange-forming member being movable with said flange-forming member and means for welding said members together comprising electrodes engaging said members, means for forcing the electrode which engages said flange-forming member toward the other of said members and means for supplying welding current to said electrodes.

9. Welding mechanism comprising supports for members, respectively, from which the web portion and a flange portion of a beam are to be formed and disposed in angular relation to each other, means engaging said members, respectively, for clamping said members against said supports, said support and said clamping means for said flange-forming member being movable with said flange-forming member, and means for welding said members together comprising electrodes engaging said members, means for forcing the electrode which engages said flange-forming members toward the other of said members and means for supplying welding current to said electrodes.

10. Welding mechanism comprising supports for members, respectively, from which the web portion and a flange portion of a beam are to be formed and disposed in angular relation to each other, the flange-forming member having a rib on the face thereof opposing an edge of said web-forming member, said support for said flange-forming member engaging beneath said rib, and means for welding said members together comprising longitudinal series of electrodes engaging face portions of said members, the engagement of the electrodes with said flange-forming member being at the face thereof opposite that from which said rib extends, and means for supplying welding current to said electrodes.

11. Welding mechanism for welding together sidewise disposed elements comprising supporting means for said elements, clamping means for clamping said elements against said supporting means, electrodes engaging said elements and relatively movable for forcing said elements together, gaging means for the edge of the work opposite that at which the weld is to be effected, means operative to actuate said clamping means to initially lightly clamp said elements, means operative to relatively move said electrodes while said elements are lightly clamped to insure engagement of the edge of the work with said gauging means, means for actuating said clamping means to thereafter tightly clamp said elements, and means for supplying welding current to said electrodes.

12. Welding mechanism comprising longitudinal series of electrodes for engaging face portions of members from which the web portions and a flange portion of a beam are to be formed and disposed in angular relation to each other, the flange-forming member having a rib on the face thereof opposite that engaged by the electrodes cooperating therewith and opposing an edge of said web-forming member, means for supplying current to said electrodes, and means engaged by said rib for alining said rib and web-forming member.

13. Welding mechanism comprising supporting means for members from which the web portion and a flange portion of a beam are to be formed and disposed in angular relation to each other, a stop adjacent the edge of the web forming member opposite that at which the flange forming member is to be welded, a clamp for said web forming member, electrodes for engaging said web forming member and said flange forming member, means for initially supplying comparatively slight pressure to said clamp and to the one of said electrodes which engages said flange forming member and operating to force against said stop the adjacent one of said members and thereafter exert relatively great pressure against said clamp and said last referred to electrode with greater pressure against said clamp, means for pressing the other of said electrodes against said web forming member, and means for supplying welding current to said electrodes.

14. Welding mechanism comprising supporting means for members from which the web portion and a flange portion of a beam are to be formed and disposed in angular relation to each other, a stop adjacent the edge of the web forming member opposite that at which the flange forming member is to be welded, a clamp for said web forming member, electrodes for engaging said web forming member and said flange forming member, means for initially supplying comparatively slight pressure to said clamp and to the one of said electrodes which engages said flange forming member and operating to force against said stop the adjacent one of said members and thereafter exert relatively great pressure against said clamp and said last referred to electrode with greater pressure against said clamp, means operative to press the other of said electrodes against said web forming member after the initial pressure is exerted against said clamp and the flange engaging electrode, and means for supplying welding current to said electrodes.

WILFRED SYKES.